United States Patent [19]

Zeutschel

[11] 3,754,435
[45] Aug. 28, 1973

[54] MATERIAL TESTER
[75] Inventor: Milton F. Zeutschel, Issaquah, Wash.
[73] Assignee: Automation Industries, Inc., Los Angeles, Calif.
[22] Filed: Nov. 15, 1971
[21] Appl. No.: 198,654

Related U.S. Application Data
[63] Continuation of Ser. No. 836,295, June 25, 1969, abandoned.

[52] U.S. Cl............ 73/71.5 U, 73/67.8 R, 310/8.7, 310/9.1
[51] Int. Cl. ........................................... G01n 29/04
[58] Field of Search ........................... 73/67.5–67.9, 71.5; 310/8.2, 8.7, 9.1

[56] References Cited
UNITED STATES PATENTS
3,109,111  10/1963  Wiggins .............................. 310/8.2
3,114,848  12/1963  Kritz .................................... 310/9.1
3,190,111   6/1965  Trussell et al. ...................... 73/67.5
3,518,460   6/1970  Wood et al. ......................... 310/8.2

Primary Examiner—Richard C. Queisser
Assistant Examiner—John P. Beauchamp
Attorney—Dan R. Sadler

[57] ABSTRACT

A nondestructive material tester is provided with a search unit capable of being air coupled to the workpiece under test. The search unit includes an electrically and acoustically nonconductive insert having an elevated surface between a transducer and the back reflective surface to form a restricted volume. The area between the transducer and the elevated surface causes an increase in the concentration of ultrasonic energy in this restricted volume and therefore increases the sensitivity of the search unit. A reflector is mounted over the transducer and positioned to cause destructive interference or out-of-phase reflections resulting in cancellation of the reflected waves.

4 Claims, 7 Drawing Figures

Patented Aug. 28, 1973

Milton F. Zeutschel,
INVENTOR.
BY.

P. Sadler

ATTORNEY.

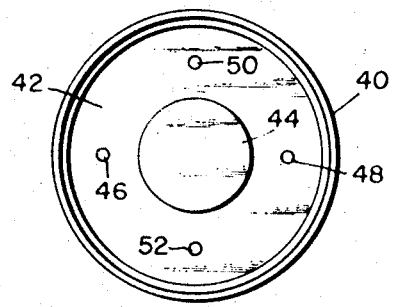
Fig. 5.
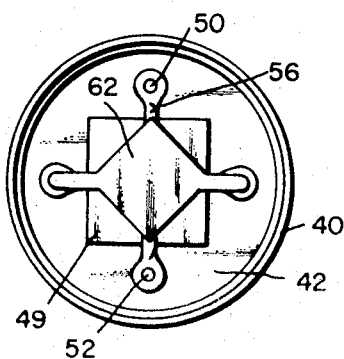
Fig. 3.
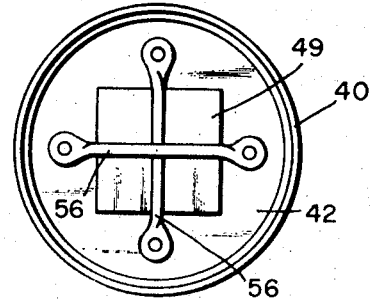
Fig. 4.
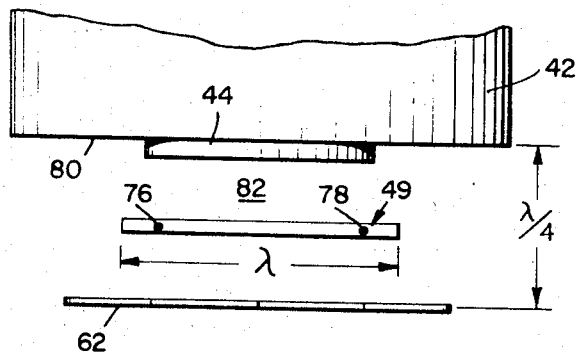
Fig. 7.
Milton F. Zeutschel,
INVENTOR.
BY.
ATTORNEY.

MATERIAL TESTER

CROSS-REFERENCE TO RELATED APPLICATIONS

This application is a continuation of co-pending application for U.S. Pat. Ser. No. 836,295, filed June 25, 1969, now abandoned, for Material Tester, on behalf of Milton F. Zeutschel and assigned to Automation Industries, Inc.

BACKGROUND

This invention relates to nondestructive material testers and more particularly to an air-coupled transducer used with an ultrasonic tester which tests a workpiece for flaws, defects or discontinuities, or used in measuring the thickness of the workpiece.

In the prior art there is provided electrical nondestructive test equipment which generates ultrasonic vibrations by use of a crystal transducer. The vibrations for the transducer are then sent in the form of an acoustical pulse beam into the workpiece being tested. The beam travels through large metallic parts and reflects back from the end surfaces thereof. Any flaw, defect or other discontinuity in the workpiece also causes reflections of the acoustical beam back to the instrument which indicates the location and size of discontinuity on a display such as an oscilloscope.

The search unit need only have access to one side of the workpiece being tested. The vibrations are projected from the search unit into the workpiece. A portion of the pulse is reflected back by the flaw or defect and the balance is reflected from the end surfaces. The return energy is displayed on the oscilloscope as vertical spikes. The screen on the oscilloscope exhibits electrical waveforms in the form of spikes of the initial pulse, the defect and the back and front surface reflections. Spacing of the spike on the scope is in proportion to the distance the beam traveled in the material tested, thus locating the position of any flaw by irregular spaced spikes.

Also, such a tester is used to determine the thickness of the workpiece by the regularity of the return back and front surface spikes. If any discrepancies appear in the thickness, they are detected by the relative change in the spikes displayed on the scope.

In these prior art devices, the need for a couplant between the search unit and the workpiece is ever-present due to the fact that ultrasonic energy is generally greatly attenuated when transmitted through an air medium. This is especially true when using the high frequency energy now required for the proper operation of these prior art nondestructive material testers. In some cases search units and the workpiece to be tested are both immersed into a tank of liquid such as water. The search unit is coupled to the workpiece by the liquid medium and is scanned across the workpiece searching for defects therein.

Other prior art devices include a flowing water path between the search unit and the workpiece. The steady stream of water couples the sound waves into the workpieces. Yet other types of couplants include the use of glycerin or the like which is first spread across the surface of the workpiece. The search unit is then coupled into the workpiece through this glycerin medium. All of the above means of coupling the search unit to the workpiece have obvious disadvantages. The water tank medium and the flowing water path devices are difficult and inconvenient to handle, while the glycerin paste technique requires a considerable cleanup to be done after each test.

In some prior art devices physical coupling of the search unit to the workpiece is attempted. This technique has not been found very accurate, since the coupling of the acoustic vibration into the workpiece varies with the contact pressure and alignment of the transducer. Thus, if the pressure varies, the output signal or return signals picked up by the search unit will vary and present a false alarm of some sort into the search unit and the test equipment used therewith. This false alarm could be interpreted as a flaw or defect in a workpiece which is free of defects. Yet on the other hand, the contact pressure may not be heavy enough and a flaw may be overlooked.

Thus a need has arisen for a transducer search unit which has the capabilities of sending sound vibrations through the part without physical contact of the search unit on the workpiece or the submersion of the workpiece and search unit into a tank of couplant. It is well known that ultrasonic energy will travel through the air with less attenuation at the lower frequencies than at the higher frequencies. Thus a need has arisen for a device which can operate at a low enough frequency to be air coupled to the workpiece and yet be capable of transmitting sounds sufficient to detect flaws or other discontinuities within the workpiece.

SUMMARY

Briefly described the embodiment of the invention disclosed herein includes an apparatus for the nondestructive testing of a workpiece which uses an ultrasonic search unit. The search unit includes a housing having a nonconductive insert therein which serves as a back reflective surface. The insert includes an elevated surface substantially in the center thereof. A pair of mounting pins protrude from the insert and are disposed on either side of the protruding portion. A pair of contact pins is disposed on either side of said protruding portion and 90° displaced from the mounting pins. Contact pins are electrically coupled to the instrumentation of the material tester. A piezoelectric transducer is resiliently mounted upon the pins and substantially covers the elevated surface of the insert. The dimensions of the protruding portions preferably extend between the nodal points of the transducer. A reflector is mounted upon the mount pins and substantially disposed over the transducer. It is preferable that the reflector is displaced from the back reflective surface to cause destructive interference.

Ultrasonic energy received by the search unit is generally in the low frequency ranges and spreads out in a rather large lobe. Due to the restrictive space between the transducer and the protruding portion of the insert, a concentration of the ultrasonic energy centralizes in this restrictive space and thereby increases the sensitivity of the search unit.

In some systems it is desirous to provide a receive signal which has a relatively high rise time on the receive signal. This can best be effected by reduction or cancelation of all reflective waves which reflect from the surface of the workpiece. This is accomplished by the reflector being positioned from the back reflective surface of the search unit to provide reflections which are out of phase with the back reflection and virtually cancel each other out.

DRAWINGS

These and other features and advantages will become more apparent to those skilled in the art when taken into consideration with the following detailed description wherein like reference numerals indicate like and corresponding parts throughout the several views, and wherein:

FIG. 3 is a section view of the search unit taken along the lines 3—3 of FIG. 2;

FIG. 4 is a section view of the transducer search unit taken along the lines 4—4 of FIG. 2;

FIG. 5 is a section view of the search unit taken along the lines 5—5 of FIG. 2;

FIG. 7 is a semi-schematic section view of the elements of the search unit shown in FIG. 2.

Figure 1:
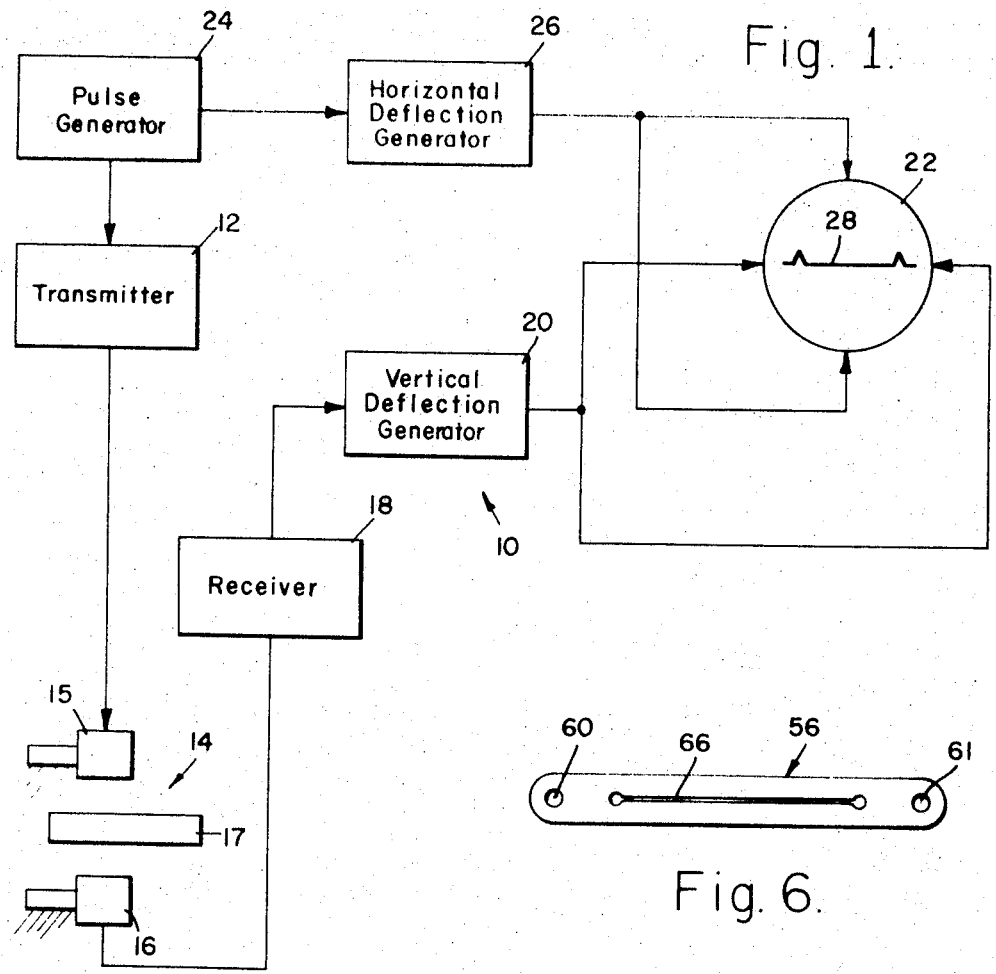
FIG. 1 is a block diagram of an ultrasonic test system employing the principles of this invention.

Turning now to the drawing there is shown a nondestructive test instrument 10. A transmitter 12 produces a series of intermittently occurring, relatively low-frequency pulses. In this embodiment a frequency between the range of 25 and 40 KCS is preferred. The transmitter 12 is coupled to a search unit 14. In the present instance the search unit 14 includes a pair of ultrasonic transducers 15 and 16. Pulses from the transmitter 12 excite the transmit transducer 15 in the search unit 14 whereby a corresponding pulse of ultrasonic energy is transmitted therefrom to a workpiece 17.

Corresponding pulses of the ultrasonic energy are received by the receive transducer 16 in the search unit 14 whereby a similar electrical signal is produced. This electrical signal is returned to a receiver 18. The receiver 18 is coupled to a vertical deflection generator 20. The generator 20 is in turn coupled to the vertical deflection means in a cathode ray tube 22. The transmitter 12 is driven by pulse generator 24. A horizontal deflection generator 26 is driven by the pulse generator 24 and is coupled to the vertical deflection means in the cathode ray tube 22. The horizontal deflection generator 26 and the vertical deflection generator 20 drive the cathode ray tube 22.

The results of the output of the receiver 18 and the horizontal deflection generator 26 are displayed in a display 28 on the face of the oscilloscope 22. The screen of the cathode ray tube 22 reflects the return energy as a measure in the time for the ultrasonic energy to pass from the transmit transducer 15 to the receive transducer 16.

If a flaw or defect is detected in the material, the flight time increases or decreases depending upon the type of defect. Also, changes in the thickness of the workpiece will be detected as a change in flight time of the ultrasonic energy and the position of the pulse spike on the scope as compared to a reference will be a measure of the thickness of the workpiece 17.

Figure 2:
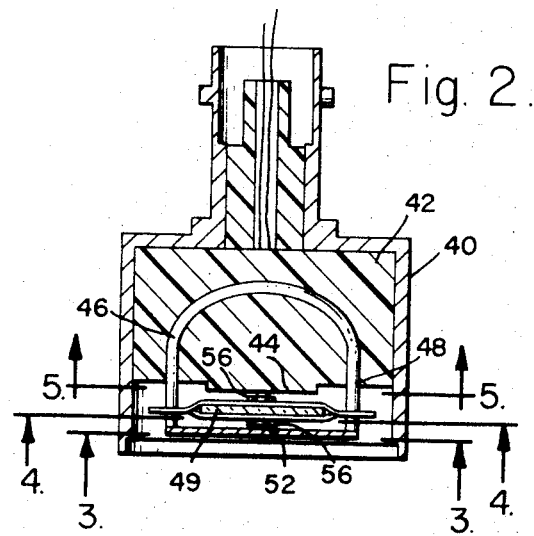
FIG. 2 is a cross-sectional view of one of the transducer search units used in the embodiment set forth in FIG. 1.

Referring now to FIG. 2 there is shown one of the transducers 15 or 16 from the search unit 14. The transducer in the search unit 14 comprises a housing 40 having an insert 42 positioned therein. The transducer housing 40 may be an electrically and acoustically non-conductive material such as plastic, epoxy or the like. Insert 42 has a cylindrical raised portion 44 (best shown in FIGS. 5 and 7) which protrudes from the insert 42 and generally towards the workpiece 17.

A U-shaped structure 46 is embedded in the insert 42 and provides two outwardly projecting pins 46 and 48. A pair of contact terminals 50 and 52 may be inserted in the insert 42. These terminals 50 and 52 are connected to a pair of conductors which lead through an opening in the top of the housing 40. This allows the electrical energy to be conducted to and from the transmit or receive transducers 15 or 16 in the search unit 14 as the case may be.

A crystal transducer 49 in the form of a piezoelectric crystal is resiliently mounted upon the posts 46, 48, 50 and 52 by a pair of resilient members 56 and 58 in the manner shown in FIG. 4.

Figure 6:
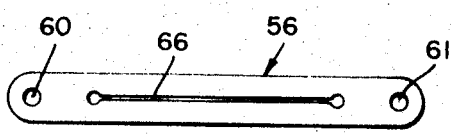
FIG. 6 is a view illustrating the resilient retaining member used in the search unit shown in FIG. 2.

With reference to the structure for mounting the crystal transducer 49 upon the insert 42, the mounting member 56 (shown in FIG. 6) is a resilient material such as rubber. The resilient member 56 is elongated with a pair of holes 60 and 61 adjacent each end. A slit 66 extends lengthwise of the member. One of the members 56 is stretched between the contact points 50 and 52 whereby the opening 60 is fastened over the post 52 and the opening 61 is fastened over the post 50.

The crystal transducer 49 is placed within the slit 66 in the resilient member 56. The resilient member 58 also connects to the crystal transducer 49 in the same manner and is positioned in the opposite direction across the crystal transducer 49, coupled across the posts 46 and 48. This type of mounting is very resilient and provides complete freedom of movement of the crystal transducer 49. As a consequence the transducer 49 can physically vibrate at its own frequency.

Turning now to FIG. 3 there is shown a reflector plate 62 which is mounted securely upon the posts 46 and 48. In this embodiment the reflector plate 62 is shown smaller in size than the transducer 49. In FIG. 7 there is shown a somewhat schematic illustration of the relative positioning of the insert 42, the elevated reflective surface 44, the crystal transducer 49 and the reflector 62.

As is well known to those skilled in the art, when the crystal transducer 49 is excited by electrical energy, it will vibrate in its thickness mode. During this vibration it is known that the crystal transducer 49 will have one or more nodes. At the node there is no motion and the motion and the motion on the opposite sides of a node are 180° out of phase with each other. Similarly, when it vibrates as a result of ultrasonic energy being incident thereon, it will vibrate about the nodes. In the cross section of FIG. 7 there are two such nodes illustrated as points 76 and 78.

Ultrasonic energy received by the transducer search unit 14, especially in low frequencies around 25 kilocycles, is not highly directional. As a consequence it spreads out in a rather large lobe (i.e., it will travel around a corner rather than traveling on a truly straight line).

It is desirable to concentrate the ultrasonic energy on the transducer crystal 49. It is especially desirable to concentrate the energy between the nodes 76 and 78.

To accomplish this a restricted space 82 is formed between the transducer crystal 49 and the elevated surface 44. The distance between the crystal transducer 49 and the surface 44 is relatively smaller than the distance between the crystal 49 and the surface 80.

The wavefront of the ultrasonic energy which does not impinge upon the crystal transducer, per se, will be incident upon and reflect from the reflection surface 80 of the insert 42. A substantial portion of this reflected energy and the energy traveling directly from the workpiece will enter into the restrictive space 82, thus creating a higher concentration of the energy on the transducer crystal 49, thereby causing an increase in the vibrations, thus increasing the pickup energy received thereby.

As is well known the resonant frequency of a crystal depends upon its physical shape. Thus, for example, a three-eighths-inch crystal has a dimension shown as lambda in FIG. 7. This dimension lambda equals one wavelength of the resonant frequency which by way of example may be in the range of 25 kilocycles.

It can be appreciated that if the distance between the transducer 15 or 16 and the adjacent side of the workpiece 17 is equal to some integral multiple of the wavelength lambda, a standing wave will be created and maintained between the transducers 15 or 16. To avoid this difficulty the reflector 62 is placed in front of the transducer crystal 49. The round-trip distance between the reflective surface of the reflector 62 and reflective surface 80 is equal to one-half lambda. As a consequence, any reflections from these two surfaces will be destructively out of phase.

In operation, it is desirable to minimize standing waves between the transducer and the workpiece as a result of energy reflected from the surface of the workpiece 17. In this embodiment the position of the reflector is based on the cancelation of waves resulting from a one-half wavelength (lambda/2) round-trip distance between the reflective surface 80 to the reflector 62. In order to eliminate the standing waves the signals reflected from the reflector 62 cancel out all reflections from the back surface 80 because they are 180° out of phase by virtue of the round-trip lambda/2 spacing therebetween. These self-canceling reflections will not, then, impinge upon the crystal 49 and the only signals detected by the crystal 49 are those that are directly from the transmit transducer.

Having thus described but one preferred embodiment of this invention, what is claimed is:

1. An ultrasonic search unit including the combination of
   a backing member,
   a reflective surface on said backing member,
   an ultrasonic transducer mounted adjacent said backing member and spaced from said reflective surface for transmitting and/or receiving ultrasonic energy,
   a protrusion on said backing member extending from said reflective surface, said protrusion being positioned adjacent to the transducer, and
   a reflector supported by said backing member whereby the ultrasonic transducer is disposed between the protrusion and the reflector, said reflector being spaced from the reflective surface at a distance that causes destructive interference between the reflections from the reflective surface and the reflector.

2. An ultrasonic search unit including the combination of
   a backing member
   a reflective surface on said backing member,
   an ultrasonic transducer mounted adjacent said backing member and spaced from said reflective surface for transmitting and/or receiving ultrasonic energy,
   a reflector member disposed in front of said transducer whereby the transducer is disposed between the backing member and the reflector member, said reflective member having a reflective surface disposed substantially parallel to the first reflective surface on said backing member, said reflective surfaces being separated from each other by a distance which will create destructive interference between the reflections therefrom.

3. An ultrasonic search unit including the combination of
   an acoustic backing member,
   a reflective surface on said backing member,
   an ultrasonic transducer effective to vibrate and radiate ultrasonic energy in response to an electrical signal applied thereto and effective to produce an electrical signal in response to ultrasonic energy incident thereon,
   means for supporting the transducer on said backing member spaced from and parallel to said reflective surface, and
   a reflector member supported by said backing member in front of the transducer and in spaced relation thereto, said reflector member having a reflective surface on the front thereof spaced one quarter wavelength from the reflective surface of the mounting member.

4. An ultrasonic search unit including the combination of
   an acoustic mounting member,
   a reflective surface on said mounting member,
   an ultrasonic transducer effective to vibrate and radiate ultrasonic energy therefrom in response to ultrasonic energy incident thereon,
   a plurality of mountings on said mounting member, said mountings being spaced from each other and projecting from said surface,
   retaining means extending between said mountings, said transducer being carried by the retaining means and suspended in spaced relation to the reflective surface,
   a reflective member secured to the mountings in front of at least a portion of said transducer, and
   a reflective surface on the front of said reflective member disposed parallel to the reflective surface on the backing member, said reflective surfaces being separated from each other by a distance which causes destructive interference between the reflections therefrom.

* * * * *